UNITED STATES PATENT OFFICE.

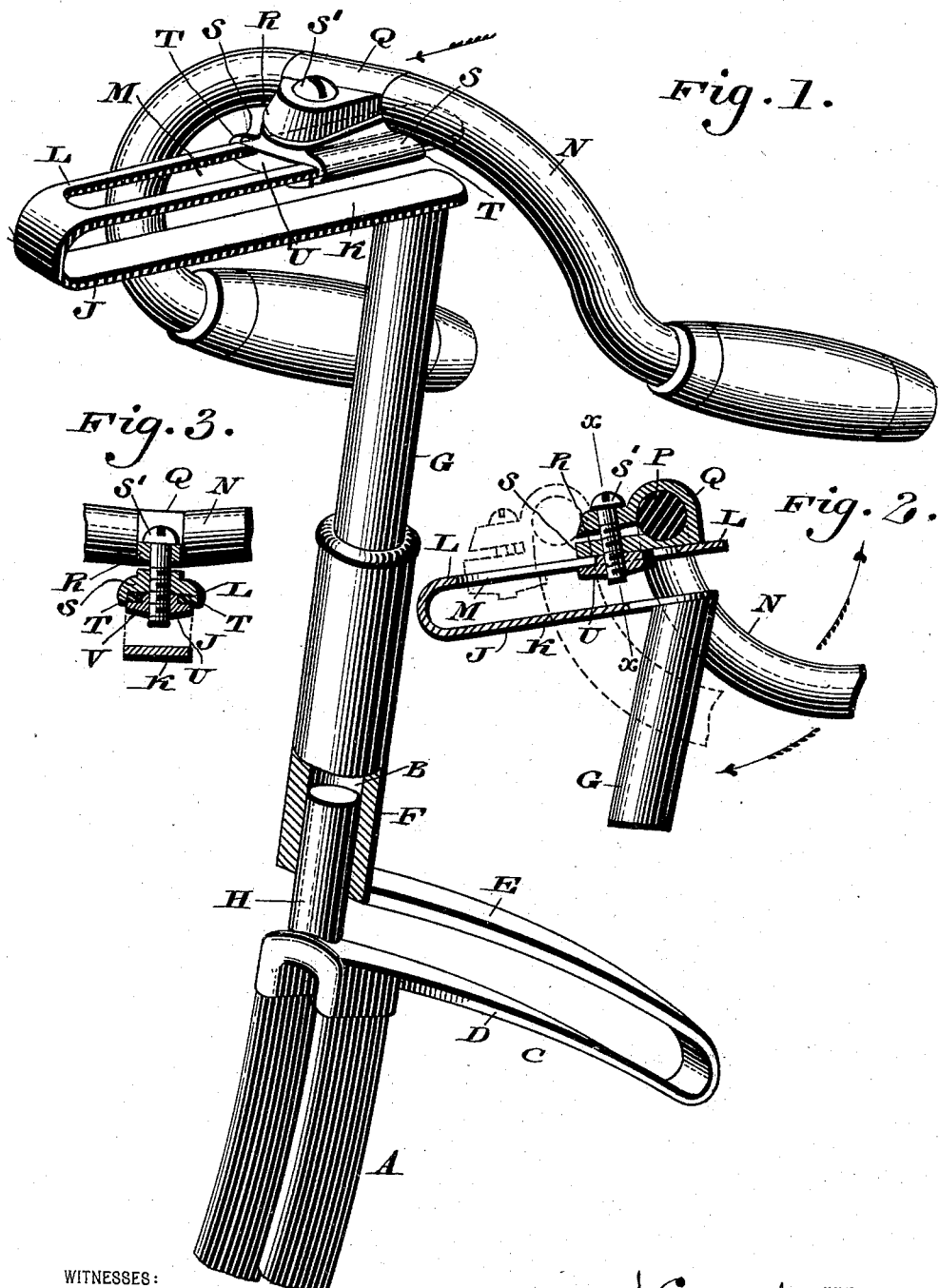

NUMA ALIX BILLE, OF PHILADELPHIA, PENNSYLVANIA, ASSIGNOR OF ONE-HALF TO FRITZ MÜLLER, OF SAME PLACE.

BICYCLE HANDLE-BAR.

SPECIFICATION forming part of Letters Patent No. 608,021, dated July 26, 1898.

Application filed April 8, 1897. Serial No. 631,197. (No model.)

*To all whom it may concern:*

Be it known that I, NUMA ALIX BILLE, a citizen of the United States, residing in the city and county of Philadelphia, State of Pennsylvania, have invented a new and useful Improvement in Bicycle Handle-Bars and Supports Therefor, which improvement is fully set forth in the following specification and accompanying drawings.

My invention consists of an improved construction of bicycle having resilient supports for the handle-bars, the novel features of which will be hereinafter fully set forth, and pointed out in the claims.

Figure 1 represents a perspective view of a bicycle handle-bar and support therefor embodying my invention. Fig. 2 represents a section of the upper portion of the device, the section being taken on line $y\,y$, Fig. 1. Fig. 3 represents a section on line $x\,x$, Fig. 2.

Similar letters of reference indicate corresponding parts in the figures.

Referring to the drawings, A designates a fork of a bicycle, the same having attached thereto in any suitable manner a resilient loop C, the same being composed of a member D and a member E, to which latter the tube F is attached, the same being provided with an opening B, in which a pin or plug H enters, the latter being secured to the member D of the resilient loop, whereby sufficient stiffness and steadiness is imparted to the front portion of the bicycle.

G designates a handle-bar post which is supported in the tubing F and held therein by any suitable means.

J designates a resilient loop, the latter consisting of the member K, which is attached or otherwise secured to the post G, said member being continued and bent upon itself, so as to form the member L, which is provided with a slot M therein.

N designates a handle-bar provided with handles of the usual construction, said handle-bar having a portion P rotatably mounted in a clamp or clip Q, the latter having a body portion R, through which a suitable fastening device or screw S' passes, said clamp having ears S, which are provided with the downwardly-extending lips T, which engage the sides of the member L, while the block U, through which the screw S' passes, is provided with shoulders V, which engage the under portion of said member L, it being thus apparent that the bars N can be rotated to the desired upper and lower position and that they can be further moved toward or from the rider upon the proper manipulation of the fastening device S'.

Attention is also called to the fact that by providing the resilient loops or springs C and J in the manner described a yielding and cushioned support is obtained for the handle-bars N, thereby greatly relieving the strain upon the arms of the rider.

The operation is as follows: When it is desired to adjust the handle-bar N vertically, the screw S' is loosened, which permits of the turning of the part P of the handle-bar N in either of the directions indicated by the arrows in Fig. 2, and by tightening the screw S' the parts are locked at the desired height.

To move the handle-bar laterally, as indicated by the arrow in Fig. 1, the screw S' is again loosened and the bars and clip and dependent parts can be moved on the member L to the desired point and again locked.

It will of course be evident that various changes may be made by those skilled in the art which will come within the scope of my invention, and I do not therefore desire to be limited in every instance to the exact construction I have herein shown and described.

Having thus described my invention, what I claim as new, and desire to secure by Letters Patent, is—

1. In a bicycle, a handle-bar post, a resilient loop secured to said post and having a slotted member, a clamping device adjustable on said slotted member and a handle-bar held in said clamping device.

2. In a bicycle, a handle-bar post, a resilient loop having one member secured to said post, a clamping device having a body portion and ears with downwardly-extending lips, a block, a screw passing through said body portion and engaging said block so as to clamp thereto a slotted member of said loop, and a handle-bar held in said clamping device.

3. In a bicycle, a handle-bar post having the loop J mounted thereon, one member of said loop being provided with a slot, a block U having shoulders thereon movable in said slot a clamping device Q adapted to engage the handle-bars N, ears S on said device Q, and a screw or fastening device common to said ears and block.

NUMA ALIX BILLE.

Witnesses:
JOHN A. WIEDERSHEIM,
WM. C. WIEDERSHEIM.